United States Patent
Im et al.

(10) Patent No.: US 11,546,565 B2
(45) Date of Patent: Jan. 3, 2023

(54) IMAGE SENSING DEVICE AND OPERATING METHOD THEREOF

(71) Applicant: SK hynix Inc., Icheon-si (KR)

(72) Inventors: Jae Hyun Im, Icheon-si (KR); Ja Min Koo, Icheon-si (KR); Tae Hyun Kim, Icheon-si (KR); Jae Hwan Jeon, Icheon-si (KR); Woo Young Jeong, Icheon-si (KR); Chang Hun Cho, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/481,841

(22) Filed: Sep. 22, 2021

(65) Prior Publication Data
US 2022/0329768 A1    Oct. 13, 2022

(30) Foreign Application Priority Data

Apr. 9, 2021    (KR) .................. 10-2021-0046791

(51) Int. Cl.
| | |
|---|---|
| H04N 9/73 | (2006.01) |
| H04N 9/77 | (2006.01) |
| H04N 9/04 | (2006.01) |
| H04N 5/232 | (2006.01) |

(52) U.S. Cl.
CPC ......... *H04N 9/735* (2013.01); *H04N 5/23229* (2013.01); *H04N 9/0451* (2018.08); *H04N 9/77* (2013.01)

(58) Field of Classification Search
CPC ......... H04N 9/735; H04N 9/0451; H04N 9/77
See application file for complete search history.

(56) References Cited

U.S. PATENT DOCUMENTS

| | | | | |
|---|---|---|---|---|
| 8,026,954 B2* | 9/2011 | Meka | ..................... | H04N 9/735 |
| | | | | 348/225.1 |
| 8,854,709 B1* | 10/2014 | Liu | ..................... | H04N 9/735 |
| | | | | 358/1.9 |
| 9,036,047 B2* | 5/2015 | Danowitz | .............. | H04N 5/235 |
| | | | | 382/167 |

(Continued)

FOREIGN PATENT DOCUMENTS

| | | | |
|---|---|---|---|
| KR | 101867568 | B1 | 6/2018 |
| KR | 101871946 | B1 | 6/2018 |

*Primary Examiner* — Brian P Yenke
(74) *Attorney, Agent, or Firm* — William Park & Associates Ltd.

(57) ABSTRACT

An image sensing device includes an image sensor including at least one pixel including a plurality of color channels and an image processor for processing an input image, based on brightness intensity values of the plurality of color channels. The image processor includes: a transmission map generator for generating color channel transmission maps including transmission values that are obtained by respectively converting brightness intensity values of the plurality of color channels, and generating a target transmission map including target transmission values that are obtained by multiplying transmission values among the transmission values that correspond to color channels; a white pixel detector for determining target pixels that are included in a white area, based on the target transmission map; and a white balance adjuster for adjusting white balance, based on average brightness intensity values of respective color channels.

20 Claims, 6 Drawing Sheets

(56) References Cited

U.S. PATENT DOCUMENTS

| | | | | |
|---|---|---|---|---|
| 9,177,363 B1* | 11/2015 | Huang | ................... | G06T 5/003 |
| 9,307,215 B1* | 4/2016 | Liu | ....................... | H04N 9/735 |
| 9,478,016 B2* | 10/2016 | Huang | ................... | G06T 5/003 |
| 9,578,296 B2* | 2/2017 | Suginohara | ........... | G09G 3/2003 |
| 9,716,867 B2* | 7/2017 | Cha | ................... | H04N 9/04555 |
| 9,979,943 B2* | 5/2018 | Miura | .............. | H04N 5/232123 |
| 10,367,976 B2* | 7/2019 | Fleizach | .............. | H04N 1/6086 |
| 10,600,165 B2* | 3/2020 | Nashizawa | ............. | G06T 5/009 |
| 10,708,564 B2* | 7/2020 | Park | ....................... | H04N 11/20 |
| 11,350,070 B2* | 5/2022 | Brown | ..................... | G06T 7/80 |
| 2014/0119651 A1* | 5/2014 | Meyers | ................... | G06T 5/007 |
| | | | | 382/167 |
| 2015/0312541 A1* | 10/2015 | Usui | ..................... | H04N 9/735 |
| | | | | 348/164 |
| 2017/0289446 A1* | 10/2017 | Gomes Leandro | .... | H04N 9/045 |
| 2018/0084208 A1* | 3/2018 | Kim | ....................... | H04N 9/77 |
| 2020/0389635 A1* | 12/2020 | Afifi | ....................... | H04N 9/73 |

* cited by examiner

| Gr | R | Gr | R | Gr |
|----|---|----|---|----|
| B  | Gb| B  | Gb| B  |
| Gr | R | Gr | R | Gr |
| B  | Gb| B  | Gb| B  |
| Gr | R | Gr | R | Gr |

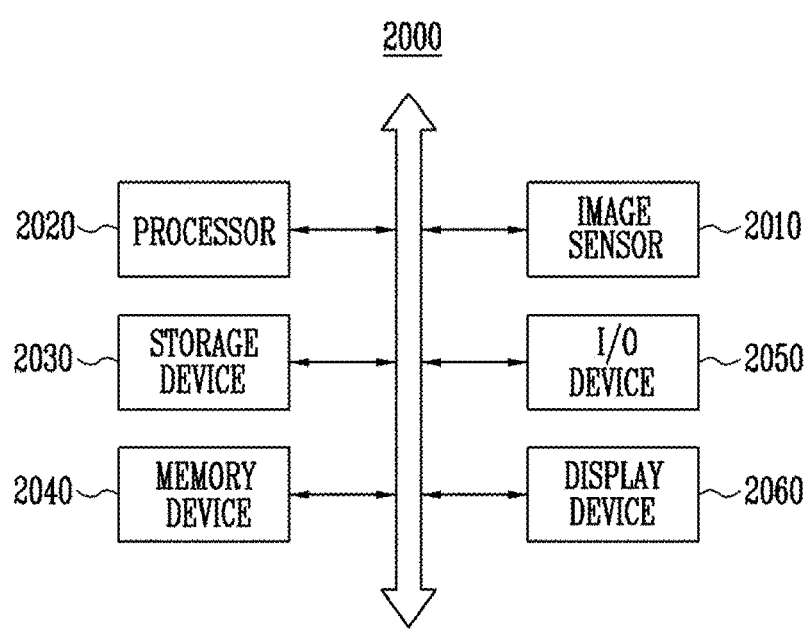

IMAGE SENSING DEVICE AND OPERATING METHOD THEREOF

CROSS-REFERENCE TO RELATED APPLICATION

The present application claims priority under 35 U.S.C. § 119(a) to Korean patent application number 10-2021-0046791 filed on Apr. 9, 2021, in the Korean Intellectual Property Office, the entire disclosure of which is incorporated by reference herein.

BACKGROUND

1. Technical Field

The present disclosure generally relates to an electronic device, and more particularly, to an image sensing device and an operating method thereof.

2. Related Art

An image sensing device is a device for capturing an image by using a characteristic of a semiconductor which reacts light. Recently, with the development of computer and communication industries, demands for image sensing devices with improved performance have increased in various fields including smart phones, digital cameras, game consoles, Internet of things, robots, surveillance cameras, medical cameras, and the like.

Image sensors may be broadly classified into a Charge Coupled Device (CCD) image sensor and a Complementary Metal Oxide Semiconductor (CMOS) image sensor. The CCD image sensor generates small noise and provides a high-quality image, as compared with the CMOS image sensor. However, the CMOS image sensor is simply driven and can be implemented according to various scanning methods. Also, since signal processing circuits can be integrated into a single chip, the CMOS image sensor can be made compact and have low power consumption. In addition, the CMOS image sensor can compatibly use a CMOS process technique, and thus the manufacturing costs of CMOS image sensors can be reduced. Recently, CMOS image sensing devices have been frequently used due to characteristics more suitable for mobile devices.

SUMMARY

In accordance with an aspect of the present disclosure, there is provided an image sensing device including: an image sensor including at least one pixel including a plurality of color channels; and an image processor configured to process an input image, based on brightness intensity values of the plurality of color channels, wherein the image processor includes: a transmission map generator configured to generate color channel transmission maps including transmission values that are obtained by respectively converting brightness intensity values of the plurality of color channels in values in a predetermined range, and generate a target transmission map including target transmission values that are obtained by multiplying transmission values among the transmission values that correspond to color channels that are included in the same pixel; a white pixel detector configured to determine target pixels that are included in a white area among pixels that are included in an image, based on the target transmission map; and a white balance adjuster configured to adjust white balance, based on average brightness intensity values of respective color channels that are included in the target pixels.

In accordance with another aspect of the present disclosure, there is provided a method for operating an image sensing device including an image sensor including at least one pixel with a plurality of color channels and an image processor for processing an input image, based on brightness intensity values of the plurality of color channels, the method including: generating color channel transmission maps with transmission values that are obtained by respectively converting brightness intensity values of the plurality of color channels in values in a predetermined range; generating a target transmission map with target transmission values that are obtained by multiplying transmission values among the transmission values that correspond to color channels that are included in a pixel with the same position in the image; determining target pixels that are included in a white area among pixels that are included in the image, based on the target transmission map; and adjusting white balance, based on average brightness intensity values of respective color channels that are included in the target pixels.

In accordance with still another aspect of the present disclosure, there is provided an image processing device for processing an input image, based on brightness information of a plurality of color channels on at least one pixel including the plurality of color channels, which is received from an image sensor including the at least one pixel, the image processing device, including: a transmission map generator configured to generate a target transmission map with target transmission values that are obtained by calculating brightness intensity values normalized such that the maximum size of the color channels that are included in the brightness information on a pixel with the same position in the image is less than or equal to 1; a white pixel detector configured to determine target pixels that are included in a white area among pixels that are included in the image, based on the target transmission map; and a white balance adjuster configured to adjust white balance, based on average brightness intensity values of respective color channels that are included in the target pixels.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 10 is a block diagram illustrating a computing system including an image sensor in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, exemplary embodiments of the present disclosure will be described in detail with reference to the accompanying drawings in order for those skilled in the art to be able to readily implement the technical spirit of the present disclosure.

Embodiments provide an image sensing device for performing an improved auto white balance operation and an operating method of the image sensing device.

Figure 1:
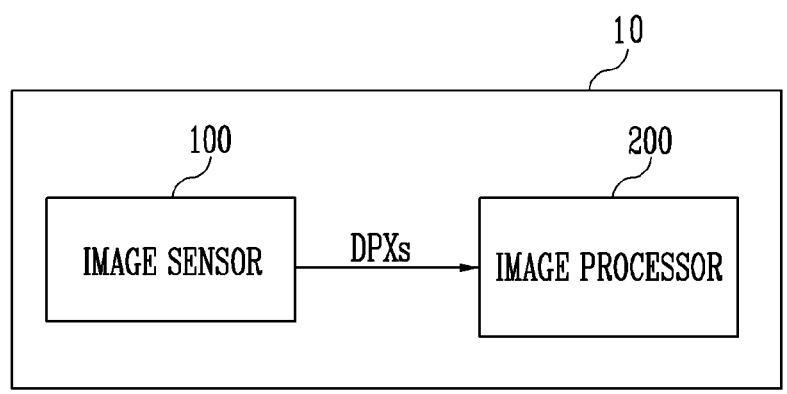
FIG. 1 is a diagram illustrating an image sensing device in accordance with an embodiment of the present disclosure.

FIG. 1 is a diagram illustrating an image sensing device in accordance with an embodiment of the present disclosure.

Referring to FIG. 1, the image sensing device 10 may include an image sensor 100 and an image processor 200.

The image sensing device 10 may be included in an electronic device, e.g., a digital camera, a mobile phone, a smart phone, a tablet personal computer (PC), a notebook, a personal digital assistant (PDA), an enterprise digital assistant (EDA), a digital still camera, a digital video camera, a portable multimedia player (PMP), a mobile internet device (MID), a PC, a wearable device, or cameras for various purposes (e.g., a front camera, a rear camera, a black box camera, and the like of a vehicle).

The image sensor 100 may be implemented with a Charged Coupled Device (CCD) image sensor and a Complementary Metal Oxide Semiconductor (CMOS) image sensor. The image sensor 100 may generate image data about an object (not shown) input (or captured through a lens (not shown). The lens (not shown) may include at least one lens forming an optical system.

The image sensor 100 may include a plurality of pixels. The image sensor 100 may generate a plurality of pixel values DPXs corresponding to a photographed image in the plurality of pixels. The plurality of pixel values DPXs generated in the image sensor 100 may be transmitted to the image processor 200. That is, the image sensor 100 may generate a plurality of pixel values DPXs corresponding to a single frame.

The image processor 200 may perform processing that is capable of improving the image quality of pixel data received from the image sensor 100, and output processed image data. The processing may be Electronic Image Stabilization (EIS), interpolation, tonal correction, image quality correction, size adjustment, etc. In an embodiment of the present disclosure, the image processor 200 may be an image processing device.

In FIG. 1, the image processor 200 may be implemented as a chip independent from that of the image sensor 100. The chip of the image sensor 100 and the chip of the image processor 200 may be implemented as one package, e.g., a multi-chip package. In another embodiment of the present disclosure, the image processor 200 may be included as a portion of the image sensor 100 to be implemented as one chip.

Figure 2:
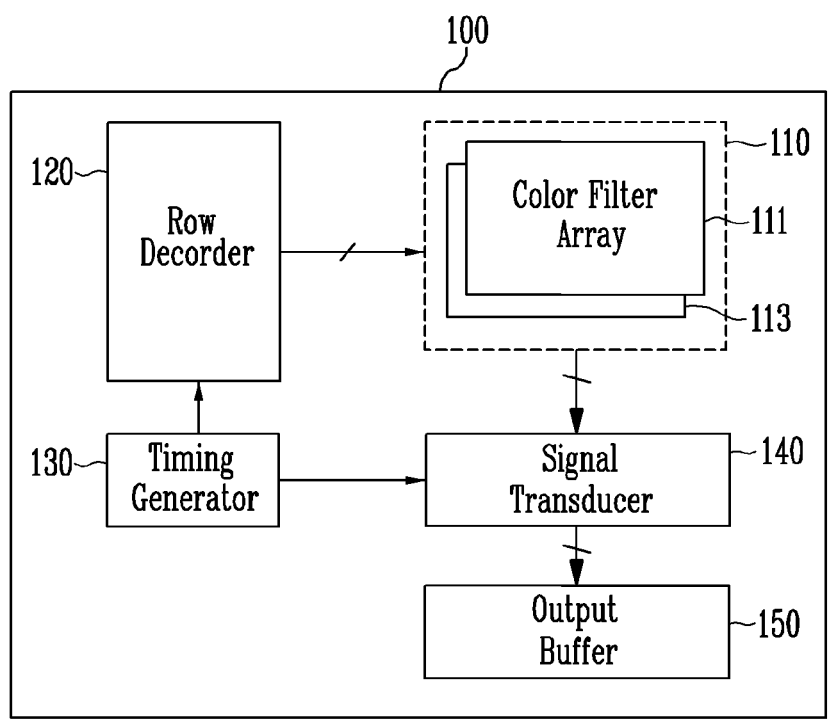
FIG. 2 is a diagram illustrating an image sensor such as that shown in FIG. 1 in accordance with an embodiment of the present disclosure.

FIG. 2 is a diagram illustrating an image sensor such as that shown in FIG. 1 in accordance with an embodiment of the present disclosure.

Referring to FIG. 2, the image sensor 100 may include a pixel array 110, a row decoder 120, a timing generator 130, and a signal transducer 140.

In accordance with an embodiment, the pixel array 110 may include a color filter array 111 and a photoelectric conversion layer 113 with a plurality of photoelectric conversion elements formed on the bottom of the color filter array 111 to correspond to a pixel of each color filter array 111. The pixel array 110 may include a plurality of pixels for outputting color information included in the incident light. Each of the plurality of pixels may output a pixel signal that corresponds to the incident light passing through a corresponding color filter array 111.

The color filter array 111 may include color filters, each of which allows only a specific wavelength (e.g., red, blue or green) of the incident light onto each pixel to pass therethrough. In the present disclosure, the color filter may be expressed as a color channel. Due to the color filter array 111, pixel data of each pixel may represent a value corresponding to the intensity of light with a specific wavelength.

Specifically, each of the plurality of pixels may accumulate photo charges generated according to the incident light, and generate a pixel signal corresponding to the accumulated photo charges. Each of the pixels may include a photoelectric conversion element (e.g., a photo diode, a photo transistor, a photogate, or a pinned photo diode) for converting an optical signal into an electrical signal and at least one transistor for processing the electrical signal.

The pixel array 110 may include a plurality of pixels arranged in row and column directions. The pixel array 110 may generate a plurality of pixel signals VPXs for each row. Each of the plurality of pixel signals VPXs may be an analog type pixel signal VPXs.

The row decoder 120 may select one row among a plurality of rows on which a plurality of pixels are arranged in the pixel array 110 in response to an address and control signals, which are output from the timing generator 130.

The signal transducer 140 may convert the plurality of analog type pixel signals VPXs into a plurality of digital type pixel values DPXs. The plurality of digital type pixel values DPXs may be output as various patterns. The signal transducer 140 may output each of digital signals by performing correlated double sampling (CDS) on each of signals output from the pixel array 110 in response to the control signals output from the timing generator 130 and performing analog-digital conversion on each of the signals on which the CDS is performed. The digital signals may be respectively signals that correspond to intensities of wavelengths of the incident lights passing through a corresponding color filter array 111.

The signal transducer 140 may include a CDS block and an analog-to-digital converter (ADC) block. The CDS block may sequentially sample and hold a set of a reference signal and an image signal, which are provided to each of a plurality of column lines included in the pixel array 110. That is, the CDS block may sample and hold levels of a reference signal and an image signal, which correspond to each of the columns. The ADC block may output pixel data obtained by converting a CDS signal for each column output from the CDS block into a digital signal. To this end, the ADC block may include a comparator and a counter, which correspond to each column.

In addition, the image sensor 100 may further include an output buffer 150. The output buffer 150 may be implemented with a plurality of buffers for storing digital signals output from the signal transducer 140. Specifically, the output buffer 150 may latch and output pixel data of each column unit, which is provided from the signal transducer 140. The output buffer 150 may temporarily store pixel data output from the signal transducer 140, and sequentially output the pixel data under the control of the timing generator 130. In some embodiments of the present disclosure, the output buffer 150 may be omitted.

Figures 3, 4:
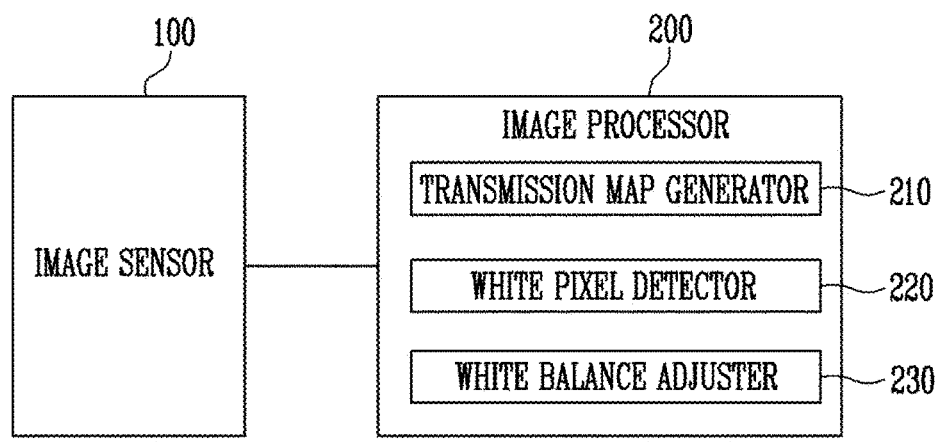
FIG. 3 is a diagram illustrating an exemplary pattern of color filters included in a pixel array shown in FIG. 2 in accordance with an embodiment of the present disclosure.
FIG. 4 is a block diagram illustrating an image sensing device in accordance with an embodiment of the present disclosure.

FIG. 3 is a diagram illustrating an exemplary pattern of color filters included in the pixel array shown in FIG. 2 in accordance with an embodiment of the present disclosure.

Referring to FIG. 3, the pixel array 110 may be arranged in an expected pattern. For example, the pixel array 110 may be arranged in a bayer pattern. The bayer pattern may be configured with repeated cells each with 2×2 cells. In each pixel, two pixels Gb and Gr with a green color filter may be disposed to obliquely face each other, and one pixel B with a blue color filter and one pixel R with a red color filter may be disposed at the other corners. The four pixels B, Gb, Gr, and R are not necessarily limited to the arrangement structure shown in FIG. 3, and are based on the bayer pattern described above. The pixels B, Gb, Gr, and R may be variously arranged in a quad bayer pattern, a nona pattern, a hexa-deca pattern, and the like.

FIG. 4 is a block diagram illustrating an image sensing device in accordance with an embodiment of the present disclosure.

Referring to FIG. 4, the image sensing device 10 may include an image sensor 100 and an image processor 200. The image sensor 100 including at least one pixel with a plurality of color channels may transmit brightness intensity values of the plurality of color channels to the image processor 200. The image processor 200 may process an image, based on the brightness intensity values of the plurality of color channels.

In accordance with another embodiment of the present disclosure, the image sensor 100 including at least one pixel with a plurality of color channels may transmit brightness information of the plurality of color channels of the pixel to the image processor 200. The image processor 200 may process an input image, based on the brightness information of the plurality of color channels.

The image processor 200 may include a transmission map generator 210, a white pixel detector 220, and a white balance adjuster 230. The image sensor 100 and the image processor 200 may correspond to the descriptions shown in FIGS. 1 and 2.

The transmission map generator 210 may generate color channel transmission maps including transmission values that are obtained by respectively converting the brightness intensity values of the plurality of color channels into values in a predetermined range. The transmission map generator 210 may generate a target transmission map including target transmission values that are obtained by multiplying transmission values among the transmission values that correspond to color channels that are included in the same pixel.

The transmission map generator 210 may normalize the brightness intensity values that are respectively received from the plurality of color channels to be greater than or equal to 0 and less than or equal to 1. The transmission map generator 210 may generate transmission values as differences between 1 and values that are obtained by multiplying the normalized brightness intensity values by a predetermined brightness separation intensity value. The transmission map generator 210 may generate color channel transmission maps including transmission values that are obtained by respectively converting the brightness intensity values of the plurality of color channels into values in a predetermined range, based on transmission values with the same kind of color channel.

In an embodiment of the present disclosure, a red channel, a green channel, and a blue channel may be included in the plurality of color channels. The transmission map generator 210 may generate a target transmission map, based on a color channel transmission map of the red channel, a color channel transmission map of the green channel, and a color channel transmission map of the blue channel.

In another embodiment of the present disclosure, the transmission map generator 210 may generate a target transmission map including target transmission values that are obtained by calculating normalized brightness intensity values such that the maximum size of color channels that are included in brightness information on a pixel with the same position in a received image is less than or equal to 1. The transmission map generator 210 may generate color channel transmission values as differences between 1 and values that are obtained by multiplying the normalized brightness intensity values by a predetermined brightness separation intensity value. The transmission map generator 210 may generate a target transmission map, based on a target transmission value of the pixel, which is generated by multiplying the color channel transmission values.

The white pixel detector 220 may determine target pixels that are included in a white area among pixels that are included in the image, based on the target transmission map. The white pixel detector 220 may check a minimum target transmission value among target transmission values that are included in the target transmission map, and determine, as target pixels, pixels with target transmission values smaller than a reference value that is obtained by multiplying the minimum target transmission value by a predetermined tuning value.

The white balance adjuster 230 may calculate a red channel gain value as a gain value for the red channel and a blue channel gain value as a gain value for the blue channel, based on an average brightness intensity value of the target pixels with respect to the red channel, an average brightness intensity value of the target pixels with respect to the green channel, and an average brightness intensity value of the target pixels with respect to the blue channel. The white balance adjuster 230 may apply the red channel gain value and the blue channel gain value to the target pixels. The white balance adjuster 230 may adjust white balance of the received image by multiplying brightness intensity values of the target pixels with respect to the red channel by the red channel gain value, and multiplying brightness intensity values of the target pixels with respect to the blue channel by the blue channel gain value.

Figure 5:
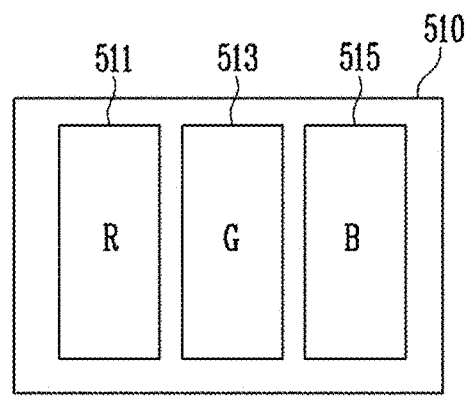
FIG. 5 is a diagram illustrating color channels that are included in a pixel in accordance with an embodiment of the present disclosure.

FIG. 5 is a diagram illustrating color channels that are included in a pixel in accordance with an embodiment of the present disclosure.

Referring to FIG. 5, a red channel 511, a green channel 513, and a blue channel 515 may be included in a pixel 510. Although a case where the red channel 511, the green channel 513, and the blue channel 515 are included in the pixel 510 illustrated in FIGS. 5 and 6, the present disclosure is not limited thereto.

When light is input to the image sensing device, the light may also be input to the pixel 510. The input light may pass through the red channel 511, the green channel 513, and the blue channel 515, which are included in the pixel 510. The red channel 511, the green channel 513, and the blue channel 515, through which the light passes, may represent brightness intensities of the light passing through the red channel 511, the green channel 513, and the blue channel 515.

For example, when red is the color of the incident light on the pixel 510, a brightness intensity value of the red channel 511 may be highest. When yellow is the color of the incident light on the pixel 510, brightness intensity values of the red channel 511 and the green channel 513 may be higher than that of the blue channel 515.

Light incident onto the pixel 510 may be expressed with brightness intensity values of the red channel 511, the green channel 513, and the blue channel 515.

Figure 6:
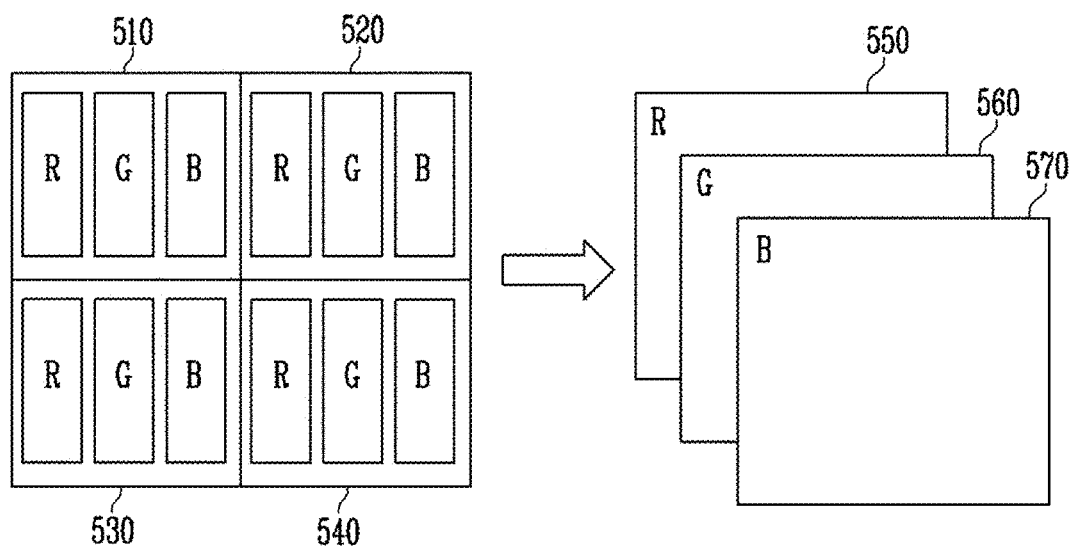
FIG. 6 is a diagram illustrating a color channel transmission map of color channels in accordance with an embodiment of the present disclosure.

FIG. 6 is a diagram illustrating a color channel transmission map of color channels in accordance with an embodiment of the present disclosure.

Referring to FIG. 6, pixels 520, 530, and 540 identical to the pixel 510 shown in FIG. 5 are included in the image sensor, and an image input to the image sensor may be expressed with a red channel transmission map 550, a green channel transmission map 560, and a blue channel transmission map 570.

The red channel transmission map 550 may be configured based on brightness intensity values of red channels that are included in the pixels 510, 520, 530, and 540. The green channel transmission map 560 may be configured based on brightness intensity values of green channels that are included in the pixels 510, 520, 530, and 540. The blue channel transmission map 570 may be configured based on brightness intensity values of blue channels that are included in the pixels 510, 520, 530, and 540.

For example, it may be assumed that the position of the pixel 510 is (0, 0) and the position of the pixel 520 is (0, 1). It may be assumed that the position of the pixel 530 is (1, 0) and the position of the pixel 540 is (1, 1). A red channel brightness intensity value of the pixel 510 may be included in (0, 0) of the red channel transmission map 550, and a red channel brightness intensity value of the pixel 520 may be included in (0, 1) of the red channel transmission map 550. A red channel brightness intensity value of the pixel 530 may be included in (1, 0) of the red channel transmission map 550, and a red channel brightness intensity value of the pixel 540 may be included in (1, 1) of the red channel transmission map 550. Therefore, a color channel transmission map corresponding to a specific color channel may be generated. Like the red channel transmission map 550, the green channel transmission map 560 and the blue channel transmission map 570 may also include channel brightness intensity values.

In accordance with the embodiment of the present disclosure, a color channel transmission map may include color channel brightness intensity values that are obtained by performing a specific calculation.

Figure 7:
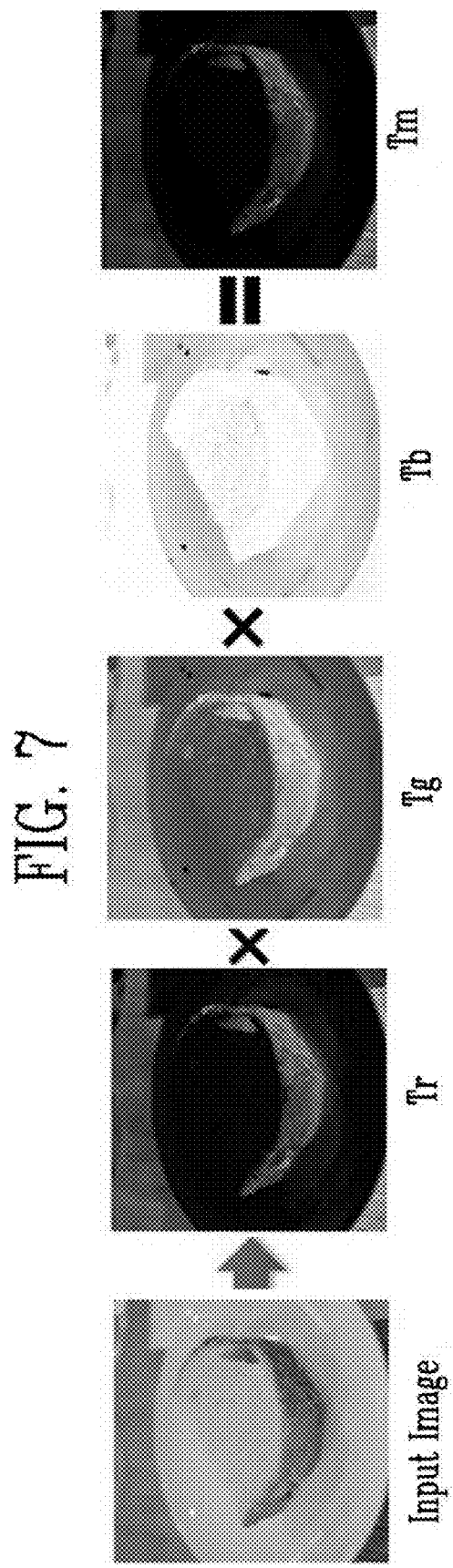
FIG. 7 is a diagram illustrating generation of a target transmission map in accordance with an embodiment of the present disclosure.

FIG. 7 is a diagram illustrating generation of a target transmission map in accordance with an embodiment of the present disclosure.

Referring to FIG. 7, the transmission map generator may generate color channel transmission maps Tr, Tg, and Tb, based on an input image. The transmission map generator may generate a target transmission map Tm. In FIG. 7, it may be assumed that a red channel, a green channel, and a blue channel are color channels that are included in each pixel.

The transmission map generator may generate a red channel transmission map Tr, a green channel transmission map Tg, and a blue channel transmission map Tb, based on the input image. The transmission map generator may normalize brightness intensity values that are respectively received from the red channel, the green channel, and the blue channel to be greater than or equal to 0 and less than or equal to 1. The transmission map generator may acquire transmission values Trr, Tgg, and Tbb as differences between 1 and values that are obtained by multiplying the normalized brightness intensity values by a predetermined brightness separation intensity value. Equations for calculating the transmission values are as follows.

$$Trr = 1 - w \times \mathrm{Imgr}$$

$$Tgg = 1 - w \times \mathrm{Imgg}$$

$$Tbb = 1 - w \times \mathrm{Imgb}$$

Imgr may be a brightness intensity value of the red channel, Imgg may be a brightness intensity value of the green channel, Imgb may be a brightness intensity value of the blue channel, and w may be a brightness separation intensity value. Trr may be a transmission value for the red channel, Tgg may be a transmission value for the green channel, and Tbb may be a transmission value for the blue channel.

The brightness separation intensity value w may be a constant value between 0 and 1. The boundary in a color channel transmission map may become more distinct as the brightness separation intensity value w becomes larger. In an embodiment of the present disclosure, the brightness separation intensity value w may be 0.95.

The transmission map generator may generate the red channel transmission map Tr, based on transmission values Trr for the red channel. The transmission map generator may generate the green channel transmission map Tg, based on transmission values Tgg for the green channel. The transmission map generator may generate the blue channel transmission map Tb, based on transmission values Tbb for the blue channel.

The color channel transmission maps Tr, Tg, and Tb may include a value of greater than or equal to 0 and less than or equal to 1. The transmission values Trr, Tgg, and Tbb included in the color channel transmission maps Tr, Tg, and Tb may come closer to 0 as the intensity of light with a specific wavelength becomes stronger. The transmission values Trr, Tgg, and Tbb included in the color channel transmission maps Tr, Tg, and Tb may come closer to 1 as the intensity of light with the specific wavelength becomes weaker. That is, a kind of color included most in the input image through the transmission values Trr, Tgg, and Tbb.

The transmission map generator may generate the target transmission map Tm by multiplying transmission values Trr, Tgg, and Tbb among the transmission values with the same position of a pixel that corresponds to the color channel transmission maps that are values that are included in the color channel transmission maps. A target transmission value Tmm included in the target transmission map Tm may be a value of greater than or equal to 0 and less than or equal to 1. A portion may be determined as a brighter portion as the target transmission value Tmm comes closer to 0. On the contrary, a portion may be determined as a darker portion as the target transmission value Tmm comes closer to 1. An equation for calculating the target transmission value Tmm included in the target transmission map Tm is as follows.

$$Tmm = Trr \times Tgg \times Tbb$$

Therefore, the target transmission map Tm may be expressed as a multiplication calculation (Trr×Tgg×Tbb) of the color channel transmission maps. The transmission map generator may generate the target transmission map Tm, based on the target transmission value Tmm.

The white pixel detector may check a minimum target transmission value min(Tmm) among target transmission values Tmm included in the target transmission map Tm. The white pixel detector may determine, as target pixels, pixels with target transmission values Tmm smaller than a reference value that is obtained by multiplying the minimum target transmission value min(Tmm) by a predetermined tuning value a. The tuning value a may be a predetermined constant value. The tuning value a may be expressed as a sensitivity or a tuning gain. The number of target pixels may increase as the tuning value a increases.

The white balance adjuster may calculate a red channel gain value GainR as a gain value for the red channel and a blue channel gain value GainB as a gain value for the blue channel, based on an average brightness intensity value of the target pixels with respect to the red channel, an average brightness intensity value of the target pixels with respect to the green channel, and an average brightness intensity value of the target pixels with respect to the blue channel. Equations for calculating the red channel gain value GainR and the blue channel gain value GainB are as follows.

$$GainR = avgG/avgR$$

$$GainB = avgG/avgB$$

avgG may be an average value of brightness intensity values for the green channel that is included in the target pixels, avgR may be an average value of brightness intensity values for the red channel that is included in the target pixels, and avgB may be an average value of brightness intensity values for the blue channel that is included in the target pixels.

The white balance adjuster may perform an auto white balance operation of correcting white balance of the target pixels by multiplying the brightness intensity values of the target pixels with respect to the red channel by the red channel gain value GainR, and multiplying the brightness intensity values of the target pixels with respect to the blue channel by the blue channel gain value GainB.

Figure 8:
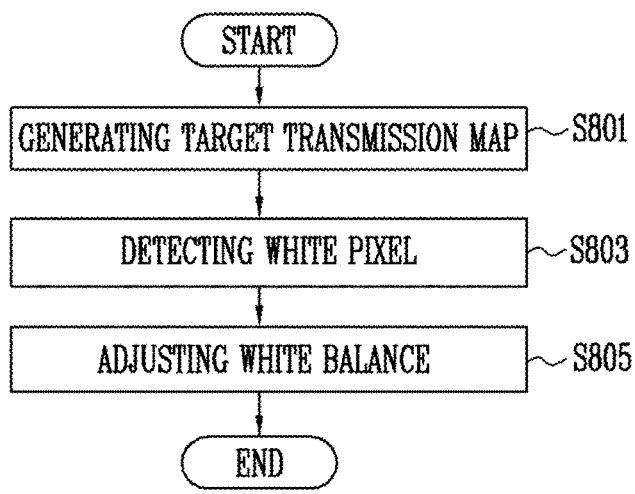
FIG. 8 is a flowchart illustrating a white balance operation in accordance with an embodiment of the present disclosure.

FIG. 8 is a flowchart illustrating a white balance operation in accordance with an embodiment of the present disclosure.

Referring to FIG. 8, the image processor may perform an auto white balance operation on an input image.

In step S801, the transmission map generator may generate color channel transmission maps including transmission values that are obtained by respectively converting brightness intensity values of a plurality of color channels into values in a predetermined range, and generate a target transmission map including target transmission values that are obtained by multiplying transmission values among the transmission values that correspond to color channels that are included in the same pixel. In another embodiment of the present disclosure, the transmission map generator may generate a target transmission map for a received image by calculating normalized brightness intensity values such that the maximum size of color channels that are included in brightness information on a pixel with the same position in the image is less than or equal to 1.

In step S803, the white pixel detector may determine target pixels that are included in a white area among pixels that are included in the image, based on the target transmission map. The white pixel detector may check a target transmission value among the target transmission values that are included in the target transmission map, and determine, as target pixels, pixels with target transmission values smaller than a reference value that is obtained by multiplying a minimum target transmission value by a predetermined tuning value.

In step S805, the white balance adjuster may perform an auto white balance operation of adjusting white balance, based on average brightness intensity values of respective color channels that are included in the target pixels. The white balance adjuster may calculate a red channel gain value as a gain value for a red channel and a blue channel gain value as a gain value for a blue channel, based on an average brightness intensity value of the target pixels with respect to the red channel, an average brightness intensity value of the target pixels with respect to a green channel, and an average brightness intensity value of the target pixels with respect to the blue channel. The white balance adjuster may adjust the white balance of the input image by multiplying the brightness intensity values of the target pixels with respect to the red channel by the red channel gain value, and multiplying the brightness intensity values of the target pixels with respect to the blue channel by the blue channel gain value.

Figure 9:
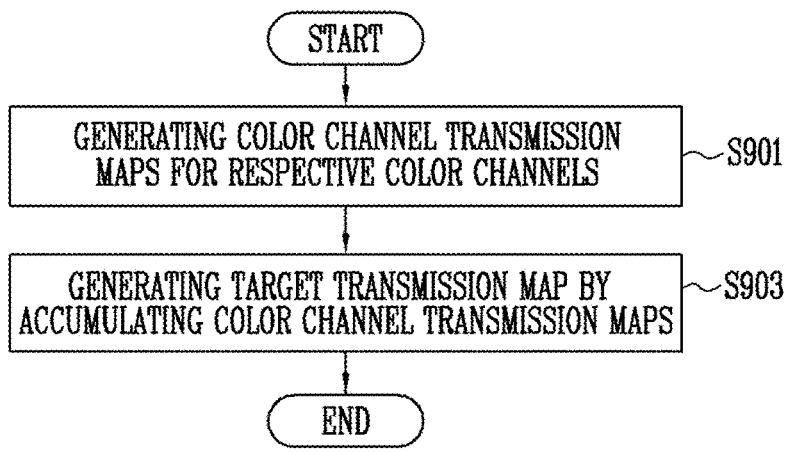
FIG. 9 is a flowchart illustrating a method for generating a target transmission map in accordance with an embodiment of the present disclosure.

FIG. 9 is a flowchart illustrating a method for generating a target transmission map in accordance with an embodiment of the present disclosure.

Referring to FIG. 9, the transmission map generator may generate a target transmission map for an input image.

In step S901, the transmission map generator may generate color channel transmission maps including transmission values that are obtained by respectively converting brightness intensity values of a plurality of color channels into values in a predetermined range. Specifically, the transmission map generator may normalize the brightness intensity values that are respectively received from the plurality of color channels to be greater than or equal to 0 and less than or equal to 1, generate transmission values as differences between 1 and values that are obtained by multiplying the normalized brightness intensity values by a predetermined brightness separation intensity value, and generate color channel transmission maps including transmission values that are obtained by respectively converting the brightness intensity values of the plurality of color channels into values in a predetermined range, based on transmission values with the same kind of color channel.

In step S903, the transmission map generator may generate a target transmission map by accumulating the color channel transmission maps. The transmission map generator may accumulate and combine transmission values with the same position of a pixel corresponding to the color channel transmission maps among the transmission values that are included in the color channel transmission maps. The transmission map generator may generate a transmission map by performing an addition calculation or a multiplication calculation on the transmission values.

In an embodiment of the present disclosure, the image sensing device may correct the input image by performing an auto white balance operation on the input image. The image sensing device may correct an image distorted due a color of a light source.

The eyes of a human being can accurately perceive a natural color which a subject has even in a light source with a specific color. The image sensor generates light reflected by the light source as a digital image, and therefore, a phenomenon may occur, in which the color of the subject is distorted as that of the light source in the environment of the light with the specific color.

In accordance with an embodiment of the present disclosure, input images may be digital images generated by a red light source or a yellow light source. The brightness intensity value of a red channel that is included a pixel to which an image is input may be entirely increase. Accordingly, an image with a color different from that of an original image may be acquired. For example, a white color of the original image may be expressed as a red color or a yellow color.

The image sensing device of the present disclosure can correct pixel values changed by the red light source or the yellow light source in an input image. The image sensing device of the present disclosure can detect a white color distorted by a light source and express the distorted white color as the white color.

FIG. 10 is a block diagram illustrating a computing system including an image sensor in accordance with an embodiment of the present disclosure.

Referring to FIG. 10, the computing system 2000 may include an image sensor 2010, a processor 2020, a storage device 2030, a memory device 2040, an input/output (I/O) device 2050, and a display device 2060. Although not shown in FIG. 10, the computing system 2000 may further include a port capable of communicating with a video card, a sound card, a memory card, a USB device, and the like, or communicating with other electronic devices.

The image sensor 2010 may generate image data corresponding to incident light. The display device 2060 may display the image data. The storage device 2030 may store the image data. The processor 2020 may control operations of the image sensor 2010, the display device 2060, and the storage device 2030.

The processor 2020 may perform specific calculations or tasks. In accordance with an embodiment of the present disclosure, the processor 2020 may be a microprocessor or a Central Processing Unit (CPU). The processor 2020 may be connected to the storage device 2030, the memory device 2040, and the I/O device 2050 through an address bus, a control bus, and a data bus to perform communication. In accordance with an embodiment of the present disclosure, the processor 2020 may also be connected to an expansion bus such as a Peripheral Component Interconnect (PCI) bus.

The storage device 2030 may include a flash memory device, a Solid State Drive (SSD), a Hard Disk Drive (HDD), a CD-ROM, all types of nonvolatile memory devices, and the like.

The memory device 2040 may store data necessary for an operation of the computing system 2000. For example, the memory device 2040 may include volatile memory devices such as a Dynamic Random Access Memory (DRAM) and a Static Random Access Memory (SRAM), and nonvolatile memory devices such as an Erasable Programmable Read Only Memory (EPROM), an Electrically Erasable Programmable Read Only Memory (EEPROM), and a flash memory device.

The I/O device may include an input means such as a keyboard, a keypad, or a mouse, and an output means such as a printer or a display.

The image sensor 2010 may be connected to the processor 2020 through the buses or another communication link to perform communication.

The image sensor 2010 may perform binning on a plurality of pixel data generated from a plurality of pixels that are included in a pixel array, thereby generating binning pixel data equally distributed in the pixel array.

The image sensor 2010 may be implemented with various types of packages. For example, at least some components of the image sensor 2010 may be implemented by using packages such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi-Chip Package (MCP), Wafer-level Fabricated Package (WFP), and Wafer-level processed Stack Package (WSP).

In some embodiments, the image sensor 2010 along with the processor 2020 may be integrated in one chip, or the image sensor 2010 and the processor 2020 may be respectively integrated in different chips.

Meanwhile, the computing system 2000 may be construed as all computing systems using the image sensor 2010. For example, the computing system 2000 may include a digital camera, a mobile phone, a Personal Digital Assistant (PDA), a Portable Multimedia Player (PMP), a smart phone, and the like.

In accordance with the present disclosure, there can be provided an image sensing device for performing an improved auto white balance operation.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An image sensing device comprising:
   an image sensor including at least one pixel including a plurality of color channels;
   a transmission map generator configured to generate color channel transmission maps including transmission values that are obtained by respectively converting brightness intensity values of the plurality of color channels in values in a predetermined range and configured to generate a target transmission map including target transmission values that are obtained by multiplying transmission values among the transmission values that correspond to color channels that are included in the same pixel;
   a white pixel detector configured to determine target pixels that are included in a white area among pixels that are included in an image based on the target transmission map; and
   a white balance adjuster configured to adjust white balance based on average brightness intensity values of respective color channels that are included in the target pixels.

2. The image sensing device of claim 1, wherein the transmission map generator normalizes the brightness intensity values that are respectively received from the plurality of color channels to be greater than or equal to 0 and less than or equal to 1, generates the transmission values as differences between 1 and values that are obtained by multiplying the normalized brightness intensity values by a predetermined brightness separation intensity value and generates the color channel transmission maps for the respective plurality of color channels based on the transmission values with the same kind of color channel.

3. The image sensing device of claim 2, wherein a red channel, a green channel, and a blue channel are included in the plurality of color channels, and
   wherein the transmission map generator generates the target transmission map, based on a color channel transmission map for the red channel, a color channel transmission map for the green channel, and a color channel transmission map for the blue channel.

4. The image sensing device of claim 1, wherein the white pixel detector checks a minimum target transmission value among target transmission values that are included in the target transmission map, and determines, as the target pixels, pixels with a target transmission value that is smaller than a reference value that is obtained by multiplying the minimum target transmission value by a predetermined tuning value.

5. The image sensing device of claim 1, wherein the white balance adjuster calculates color channel gain values by dividing an average brightness intensity value for at least one color channel among the plurality of color channels, respectively, by average brightness intensity values for the other color channels and corrects white balance of the target pixels by respectively multiplying brightness intensity values that are included in the target pixels by the color channel gain values corresponding to a color.

6. The image sensing device of claim 5, wherein a red channel, a green channel, and a blue channel are included in the plurality of color channels, and
   wherein the white balance adjuster calculates a red channel gain value as a gain value for the red channel and a blue channel gain value as a gain value for the blue channel, based on an average brightness intensity value of the target pixels with respect to the red channel, an average brightness intensity value of the target pixels with respect to the green channel, and an average brightness intensity value of the target pixels with respect to the blue channel, and applies the red channel gain value and the blue channel gain value to the target pixels.

7. The image sensing device of claim 6, wherein the white balance adjuster multiplies brightness intensity values of the target pixels for the red channel by the red channel gain value and multiplies brightness intensity values of the target pixels for the blue channel by the blue channel gain value.

8. A method for operating an image sensing device including an image sensor including at least one pixel with a plurality of color channels and an image processor for processing an input image based on brightness intensity values of the plurality of color channels, the method comprising:
   generating color channel transmission maps with transmission values that are obtained by respectively converting brightness intensity values of the plurality of color channels in values in a predetermined range;
   generating a target transmission map with target transmission values that are obtained by multiplying transmission values among the transmission values that correspond to color channels that are included in a pixel with the same position in the image;
   determining target pixels that are included in a white area among pixels that are included in the image, based on the target transmission map; and
   adjusting white balance based on average brightness intensity values of respective color channels that are included in the target pixels.

9. The method of claim 8, wherein the generating of the color channel transmission maps includes:
   normalizing the brightness intensity values that are respectively received from the plurality of color channels to be greater than or equal to 0 and less than or equal to 1;
   generating the transmission values as differences between 1 and values that are obtained by multiplying the normalized brightness intensity values by a predetermined brightness separation intensity value; and
   generating the color channel transmission maps for the respective plurality of color channels, based on the transmission values with the same kind of color channel.

10. The method of claim 9, wherein a red channel, a green channel, and a blue channel are included in the plurality of color channels, and
    wherein, in the generating of the target transmission map, the target transmission map is generated based on a color channel transmission map for the red channel, a color channel transmission map for the green channel, and a color channel transmission map for the blue channel.

11. The method of claim 8, wherein the determining of the target pixels further includes:
    checking a minimum target transmission value among target transmission values that are included in the target transmission map; and
    determining, as the target pixels, pixels with target transmission value that is smaller than a reference value that is obtained by multiplying the minimum target transmission value by a predetermined tuning value.

12. The method of claim 8, wherein the adjusting of the white balance further includes:
   calculating color channel gain values by dividing an average brightness intensity value for at least one color channel among the plurality of color channels, respectively, by average brightness intensity values for the other color channels; and
   correcting white balance of the target pixels by respectively multiplying brightness intensity values that are included in the target pixels by the color channel gain values that correspond to a color.

13. The method of claim 12, wherein a red channel, a green channel, and a blue channel are included in the plurality of color channels, and
   wherein, in the calculating of the color channel gain values, a red channel gain value as a gain value for the red channel and a blue channel gain value as a gain value for the blue channel are calculated, based on an average brightness intensity value of the target pixels with respect to the red channel and an average brightness intensity value of the target pixels with respect to the green channel.

14. The method of claim 13, wherein, in the correcting of the white balance of the target pixels, brightness intensity values of the target pixels for the red channel are multiplied by the red channel gain value, and brightness intensity values of the target pixels for the blue channel are multiplied by the blue channel gain value.

15. An image processing device for processing an input image, based on brightness information of a plurality of color channels on at least one pixel including the plurality of color channels, which is received from an image sensor including the at least one pixel, the image processing device, comprising:
   a transmission map generator configured to generate a target transmission map with target transmission values that are obtained by calculating brightness intensity values normalized such that the maximum size of the color channels that are included in the brightness information on a pixel with the same position in the image is less than or equal to 1;
   a white pixel detector configured to determine target pixels that are included in a white area among pixels that are included in the image, based on the target transmission map; and
   a white balance adjuster configured to adjust white balance, based on average brightness intensity values of respective color channels that are included in the target pixels.

16. The image processing device of claim 15, wherein the transmission map generator generates the transmission values as differences between 1 and values that are obtained by multiplying the normalized brightness intensity values by a predetermined brightness separation intensity value, and generates the target transmission map based on the target transmission value of the pixel that is generated by multiplying the color channel transmission values.

17. The image processing device of claim 16, wherein the white pixel detector checks a minimum target transmission value among the target transmission values, and determines, as the target pixels, pixels with target transmission value that is smaller than a reference value that is obtained by multiplying the minimum target transmission value by a predetermined tuning value.

18. The image processing device of claim 17, wherein the white balance adjuster calculates color channel gain values by dividing an average brightness intensity value for at least one color channel among the plurality of color channels, respectively, by average brightness intensity values for the other color channels, and corrects white balance of the target pixels by respectively multiplying brightness intensity values that are included in the target pixels by the color channel gain values corresponding to a color.

19. The image processing device of claim 18, wherein a red channel, a green channel, and a blue channel are included in the plurality of color channels, and
   wherein the white balance adjuster calculates a red channel gain value as a gain value for the red channel and a blue channel gain value as a gain value for the blue channel, based on an average brightness intensity value of the target pixels with respect to the red channel, an average brightness intensity value of the target pixels with respect to the green channel, and an average brightness intensity value of the target pixels with respect to the blue channel, and applies the red channel gain value and the blue channel gain value to the target pixels.

20. The image processing device of claim 19, wherein the white balance adjuster multiplies brightness intensity values of the target pixels for the red channel by the red channel gain value, and multiplies brightness intensity values of the target pixels for the blue channel by the blue channel gain value.

* * * * *